United States Patent
Woodgate et al.

(10) Patent No.: US 8,031,276 B2
(45) Date of Patent: Oct. 4, 2011

(54) MANUFACTURE OF A BIREFRINGENT LIQUID CRYSTAL COMPONENT

(75) Inventors: Graham John Woodgate, Henley-on-Thames (GB); Jonathan Harrold, Warwick (GB)

(73) Assignee: AU Optronics Corporation, Hsin-Chu (TW)

( * ) Notice: Subject to any disclaimer, the term of this patent is extended or adjusted under 35 U.S.C. 154(b) by 258 days.

(21) Appl. No.: 12/441,480

(22) PCT Filed: Nov. 21, 2007

(86) PCT No.: PCT/GB2007/004455
§ 371 (c)(1),
(2), (4) Date: Mar. 16, 2009

(87) PCT Pub. No.: WO2008/062188
PCT Pub. Date: May 29, 2008

(65) Prior Publication Data
US 2010/0007806 A1   Jan. 14, 2010

(30) Foreign Application Priority Data
Nov. 24, 2006   (GB) .................................. 0623491.8

(51) Int. Cl.
G02F 1/1335   (2006.01)
(52) U.S. Cl. .......................... 349/15; 349/57
(58) Field of Classification Search .................. None
See application file for complete search history.

(56) References Cited

U.S. PATENT DOCUMENTS

| | | | |
|---|---|---|---|
| 5,132,147 A | 7/1992 | Takiguchi et al. | |
| 5,751,388 A | 5/1998 | Larson | |
| 6,069,650 A * | 5/2000 | Battersby | 348/59 |
| 6,262,788 B1 | 7/2001 | Hanrahan et al. | |
| 7,471,352 B2 * | 12/2008 | Woodgate et al. | 349/57 |
| 2002/0055057 A1 | 5/2002 | Bekku et al. | |
| 2003/0058383 A1 | 3/2003 | Jagt et al. | |
| 2005/0042391 A1 * | 2/2005 | Ryan et al. | 428/1.1 |
| 2007/0109400 A1 * | 5/2007 | Woodgate et al. | 348/47 |

FOREIGN PATENT DOCUMENTS

| | | |
|---|---|---|
| CN | 1823292 | 8/2006 |
| EP | 1089113 A3 | 10/2003 |
| GB | 2403814 A | 1/2005 |
| WO | WO 03/015424 | 2/2003 |
| WO | WO 2005/006056 | 1/2005 |

OTHER PUBLICATIONS

English language translation of abstract and pertinent parts of CN 1823292 (Aug. 23, 2006). Mock-Knoblauch, "Novel Polymerisable Liquid Crystalline Acrylates for the Manufacturing of Ultrathin Optical Films", p. 1673-1676, SID Digest 2006.

* cited by examiner

Primary Examiner — Tina Wong
(74) Attorney, Agent, or Firm — Thomas, Kayden, Horstemeyer & Risley, LLP

(57) ABSTRACT

Manufacture of a birefringent liquid crystal cell is performed as follows. A layer of isotropic material having an outer surface which is shaped with a surface relief structure and is provided with a liquid crystal alignment property is formed. A flexible sheet having an outer surface provided with a liquid crystal alignment property is formed. A curable birefringent liquid crystal material is applied to one or both of the layer of isotropic material and the flexible sheet. The flexible sheet is applied over the layer of isotropic material with the outer surfaces of the layer of isotropic material and the flexible sheet facing one another with the liquid crystal material therebetween, thereby to form a liquid crystal cell. The liquid crystal material is cured and the flexible sheet is removed from the liquid crystal cell.

21 Claims, 9 Drawing Sheets

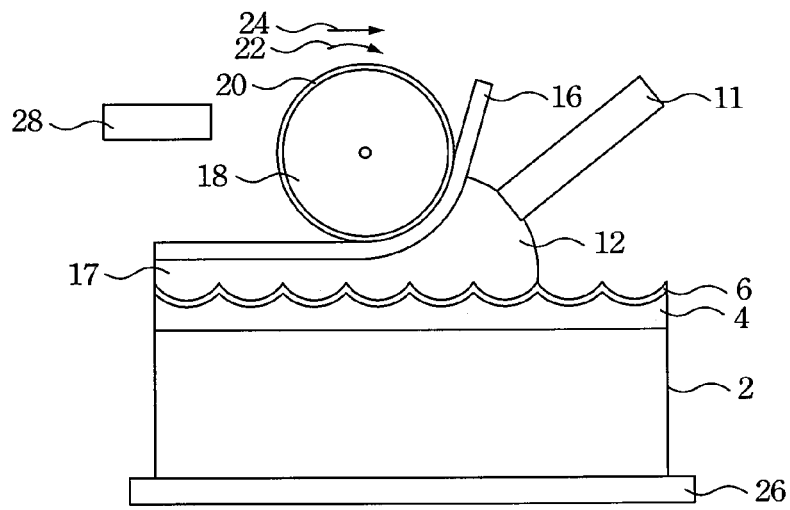
Fig. 3A
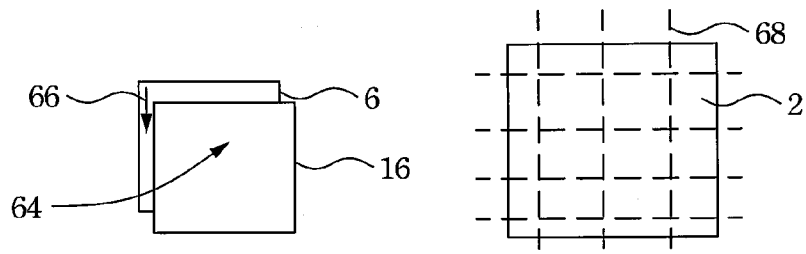
Fig. 3C
Fig. 3H
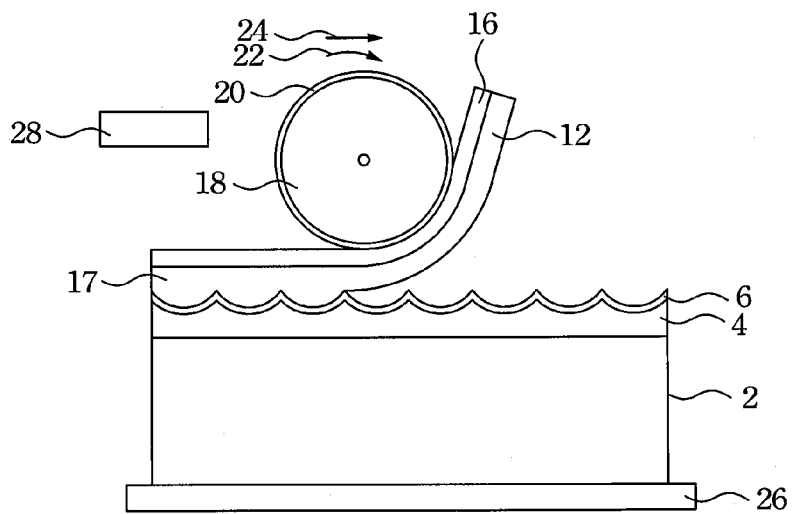
Fig. 3D

MANUFACTURE OF A BIREFRINGENT LIQUID CRYSTAL COMPONENT

RELATED APPLICATIONS

This application is a co-pending application which claims priority to PCT Application No. PCT/GB2007/004455, filed Nov. 21, 2007, herein incorporated by reference in its entirely.

BACKGROUND

1. Field of Invention

The present invention relates to the manufacture of surface relief birefringent liquid crystal components. Such components are suitable for use in a wide range of applications, including without limitation autostereoscopic 3D displays, brightness enhanced displays, for use in illuminating display devices, particularly transmissive and transflective display systems and as a switching component for use in optical networking.

2. Description of Related Art

Surface relief birefringent optical components are described for example in WO-03/015424 and WO-2005/006056. A birefringent microlens array is formed from a surface relief interface between an isotropic material and an aligned birefringent liquid crystal material. Light of a first linear polarisation state passing through the device sees a first refractive index step at the surface relief interface between the isotropic material and the birefringent liquid crystal material, whereas light of a second orthogonal linear polarisation state sees a second, different refractive index step at the interface. A birefringent component of this type for a backlight is described for example in U.S. Pat. No. 5,751,388. A backlight system of this type for providing emission of polarised light is described in US-2003/0,058,383, in which disclosure a structured birefringent optical component is arranged to deflect light of a first polarisation and not deflect light of a second polarisation.

Birefringent liquid crystal components can be formed by means of a liquid crystal cell filling method as shown in FIG. 1. A rigid substrate 2 such as a glass or polymer substrate, has an isotropic polymer layer 4 formed on its surface by means of UV casting, embossing, thermal forming or other well known methods. The outer surface of the layer 4 is shaped with a surface relief structure and has provided thereon an alignment layer 6, for example polyimide. The alignment layer 6 may be formed for example by means of spin coating, printing or other known methods. The alignment layer 6 is cured, and rubbed to produce a directional liquid crystal alignment property. A second rigid substrate 8 with a second alignment layer 10 forms a cell gap between the alignment layers 6,10 which is capillary filled by birefringent liquid crystal material 12 as shown by arrow 14 typically at elevated temperature. The liquid crystal material 12 may be a curable liquid crystal material. In this case, following filling, the material is cured, for example thermally, by light or by electron beam radiation. Such materials allow high ruggedness, and can enable a reduction in the thickness of devices.

Such a capillary filling process has a number of difficulties. A lenticular surface with an array of elongate cylindrical lenses is a common surface relief structure. In this case, the capillary fill will often take place along the length of the lenses. However, these lenses may be susceptible to blockage, so that they do not fill uniformly, creating bubbles which degrade optical performance. In curable liquid crystal materials, bubbles may contain oxygen which inhibits cure of some types of polymerisable liquid crystal material. This can cause regions of strain in the cured material, degrading alignment properties of the liquid crystal material near the bubble.

More even filling can be achieved by incorporating a larger spacer gap between the alignment layers 6 and 10. However, such an approach disadvantageously uses more material, and so increases cost. Further, the uniformity of the thickness of additional material can be difficult to maintain, so the final device may not be flat, which may cause non-uniform optical output for example in an autostereoscopic display system.

During filling, a vacuum can be used to avoid the formation of air bubbles. Vacuum equipment is disadvantageously expensive, and the high levels of vacuum required for vacuum filling may not be compatible with the lens polymer materials.

The device further requires two substrates 2 and 8. Such substrates typically have a thickness of 0.4 mm or greater. The overall thickness of the display is thus large. To reduce thickness after fabrication, the present inventors have considered notionally removing the substrate 8 from the cured liquid crystal material 12. However, this is problematic. Removal of the rigid substrate 8 is difficult. If the substrate 8 is formed from glass, it may be prone to cracking. The surface energies of the interface between the liquid crystal material 12 and the alignment layers 6, 10 may be similar, so that delamination may take place unpredictably off either surface, therefore resulting in unreliability of delamination release. Further, the adhesion of the liquid crystal material 12 to the alignment layer 6 is required to be as high as possible, to maximise the endurance properties of the device. Higher surface energy may be achieved by addition of a wetting agent to the liquid crystal material 12. However, this may also increase the adhesion to the alignment layer 10, and thus reduce the reliability of delamination at the planar interface.

Further, the addition of alignment layer 10 adds cost to the processing method.

Further, the filling process can take some hours, particularly for a large cell required for large displays or for motherglass processing methods. Where the liquid crystal material 12 is a polymer liquid crystal it may be liable to thermal cure prior to cure by for example ultraviolet radiation. This means that such materials are difficult to use reliably in processes with prolonged process time. Premature cure may result in regions of non-uniform liquid crystal alignment and filling errors.

Another difficulty is that when birefringent components such as shown in FIG. 1 are manufactured in motherglass form, it is difficult to cut the motherglass and separate the individual components after processing in motherglass form. It is required to cut through the two different substrates 8, 2 as well as through the cured polymer layer 4 and the liquid crystal material 12 without causing delamination of the polymer material 4 or cured liquid crystal material 12.

It would be desirable to provide a method of manufacture of a surface relief birefringent liquid crystal component in which at least some of these difficulties are alleviated.

SUMMARY

To this end, the present inventors have considered notionally the formation of a liquid crystal layer as a cured film by means of a coating process of liquid crystal material. The manufacture of uniform thickness birefringent optical films using liquid crystal in solvent is described for example in U.S. Pat. Nos. 5,132,147; 6,262,788; and Mock-Knoblauch, "Novel polymerisable liquid crystalline acrylates for the manufacturing of ultrathin optical films", SID Digest 2006. In the latter, a coating solution comprises a polymer liquid crystalline material in a solvent solution. The solution is applied wet to the surface of a polymer film. The solvent is driven off and the material is exposed to UV light to cure the film.

FIG. 2 shows an apparatus notionally considered by the present inventors to apply such a coating method to fabricate birefringent liquid crystal components. Using this apparatus, a surface relief structure of a polymer layer 4 on a substrate 2, having an alignment layer 6, is overcoated by means of a coater such as a slot coater 19 filled with polymerisable liquid crystal 12. Such an arrangement would be intended to produce a film 21 of liquid crystal material in contact with air or a gas such as nitrogen. The film is subsequently cured by means of a UV light source 23. In principle this might alleviate some of the difficulties associated with the use of the second substrate 8 in the known manufacturing process described above with reference to FIG. 1. However, if such a process of coating of surface relief optical elements with curable liquid crystals were in fact applied, then a number of difficulties are expected to arise as follows.

The typical dry film thickness of liquid crystal material in planar devices manufactured using the known coating methods is between 1 μm to 10 μm, and requires the deposition of a wet thickness of liquid crystal material of 10 μm to 30 μm. In contrast, the typical sag of the surface relief lenses used in autostereoscopic display is 15 μm to 60 μm, and so the thickness of typical cured films of liquid crystal material would need to be substantially more than that delivered by the known coating methods.

Further, the flow of the drying material on the component may not deliver a flat surface due to differential drying properties across the width of the component.

Additionally, with such a notional technique, the film 21 of liquid crystal material is aligned only by the alignment layer 6. This is problematic. The interaction of the single alignment layer 6 with the liquid crystal material diminishes with increasing distance from the film 21. Thus alignment artifacts will appear in the liquid crystal material, the alignment artifacts increasing with the thickness of the film 21. For relatively thick surface relief birefringent components, it is desirable that alignment is provided on both sides of the liquid crystal material.

Furthermore, it is often desirable that there is a controlled twist between the alignment directions at the planar and surface relief structures on either side of the liquid crystal material. In structures with a single alignment layer, a precise twist cannot be achieved as there is no upper surface to define an alignment.

Further, the surface tension properties of coated microstructures can result in the upper surface assuming a non-flat structure, with different alignment properties at the cusps of the lenses compared to the centre of the lenses. Such a structure will result in reduced optical quality. The elements need to be maintained clean during subsequent handling. Therefore an additional protective cover may need to be added, further adding to the cost of the elements.

According to the present invention, there is provided a method of manufacture of a birefringent liquid crystal component, the method comprising:

forming (a) a layer of first material having an outer surface which is shaped with a surface relief structure and is provided with a liquid crystal alignment property, and (b) a flexible sheet having an outer surface provided with a liquid crystal alignment property;

applying a curable birefringent liquid crystal material to one or both of the outer surface of the layer of first material and the outer surface of the flexible sheet;

applying the flexible sheet over the layer of first material with the outer surfaces of the layer of first material and the flexible sheet facing one another with the liquid crystal material therebetween, thereby to form a liquid crystal cell;

curing the liquid crystal material; and removing the flexible sheet from the liquid crystal cell, thereby to form a birefringent liquid crystal component.

This method of manufacture provides a number of advantages over the known method described above with reference to FIG. 1 and over the notional method described above with reference to FIG. 2.

Compared to the notional method described above with reference to FIG. 2, the present method additionally involves the application of a flexible sheet having a liquid crystal alignment property, prior to curing. Thus alignment is provided on both sides of the liquid crystal material during the curing process. This provides a number of advantages. Most importantly, it reduces alignment artifacts. Similarly, it allows a reliable twist of alignment direction to take place within the birefringent liquid crystal material by applying the flexible sheet with a twist between the alignment directions of the liquid crystal alignment properties of the flexible sheet and the layer of first material, which may be for example isotropic.

The alignment properties, such as pre-tilt angle and stability, of the layer of first material and the flexible sheet need only be maintained during the polymerisation process rather than during the whole lifetime of the component. The upper surface of the cured liquid crystal material after cure can be maintained flat across the area of the device, improving optical quality.

The application of the liquid crystal material is straightforward to perform. It may be applied to either or both of the flexible sheet and the layer of isotropic material. It is possible to use a coating technique of the known type described above but this is not essential, it being a particular advantage that the liquid crystal material may be applied more quickly and with less precision than in the known coating techniques, due to the use of the flexible sheet forming an upper boundary for the liquid crystal material. For example, the liquid crystal material may be deposited over a limited area and forced across the component by the flexible sheet.

Furthermore, as a result of removing the flexible sheet after curing, these advantages are achieved in the resultant birefringent liquid crystal component which does not have a substrate over the liquid crystal material on the opposite side from the layer of first material providing the surface relief structure. Thus the resultant component does not suffer from the disadvantage of the known method described above with reference to FIG. 1 that the component is very thick.

Furthermore, as compared to use of two rigid substrates, the flexible sheet is very easy to remove, for example by peeling. Due to its flexibility, the surface energy of the flexible sheet means that it can conveniently be delaminated from the liquid crystal cell after curing of the liquid crystal material.

Other advantages over the known method described above with reference to FIG. 1 are as follows.

The liquid crystal material does not need to be capillary filled and can be applied in a very short timescale over large areas compared to capillary or vacuum filling. The components can thus be made without being prone to premature cure. Further, as the flexible sheet covers the liquid crystal material during curing, the component does not have to be vacuum filled or cured in a nitrogen blanket, thus reducing cost and complexity of equipment.

The flexible sheet can have a low thickness so that the cost of material can be minimised.

When it is desired to use a liquid crystal material curable by electromagnetic radiation, the flexible sheet may be transparent to that electromagnetic radiation, and the step of curing the liquid crystal material is performed by applying said electromagnetic radiation through said flexible sheet.

The method may conveniently be applied to components made in motherglass form. In this case, plural birefringent liquid crystal components are made together in motherglass form and the method further comprises cutting out the individual birefringent liquid crystal components after curing of the liquid crystal material, for example by means of laser cutting. Alternatively, the cured structure can be scribed and broken using standard glass cutting techniques.

The material of the flexible sheet may be selected so that the liquid crystal alignment property is provided by an intrinsic property of the material. The alignment property may be further enhanced by means of a treatment such as rubbing prior to application. In this case, the flexible sheet does therefore not require the formation of separate coated and processed alignment layers, and is thus cheaper to manufacture than a coated glass substrate.

Lenticular displays in which a lens array is attached to the surface of a spatial light modulator are well known. Typically a lens in air is attached in alignment to the display. However, the reflectivity of a lens surface in air is 4-5% using standard materials. Such lenses produce high levels of frontal reflections, being curved surfaces, and reduce front of screen contrast in brightly lit environments. High screen surface visibility reduces the ability to present large amounts of image depth, as it provides a visual conflict with stereoscopic depth cues. Such lenses use materials and surfaces which are expensive or difficult to coat with standard anti-reflection layers. Further, such lenses in air exhibit total internal reflection artifacts. It would be desirable to reduce the Fresnel reflections and total internal reflection artifacts from such lenses while providing surfaces suitable for low cost anti-reflection coatings.

In prior art lenticular display systems in which a lenticular screen is attached to the output of a spatial light modulator, there are notionally two arrangements for the lenticular screen comprising a planar surface and a surface relief surface. In a first arrangement light passes from the spatial light modulator, through the planar surface, through the lenticular screen material and is output through the surface relief surface. Such a lens suffers from reflectivity at the lens surface which diffuses an ambient light source, providing visibility of the lens surface, and thus degrading the 3D image quality. In a second arrangement, light is output from the spatial light modulator into an air gap, is incident on the surface relief surface, passes through the lenticular screen material and is output through the planar surface. Such an arrangement suffers from substantially the same reflectivity artifact at the curved lens surface as for the first arrangement, but also typically exhibits noticeable total internal reflection artifacts in which ambient light sources are reflected by the internal surface of the surface relief structure. This total internal reflection provides greater levels of surface visibility and thus degrades device performance.

Lenses which use low refractive index materials in contact with a lens surface are known. However, in order to generate adequate refractive index step, it is often reported that it is necessary to use materials such as fluoropolymers as one of the materials. Fluoropolymers are expensive and can be difficult to adhere to the panel. Alternatively, low refractive index materials such as silicone oils can be used, but these require sealing to prevent leakage. Such lenses have reduced reflectivity, because of the reduced index step at the surface, but reflectivity of the lens surface is present in both polarisation states.

The birefringent optical elements in this invention can be used in non-switching 3D displays with reduced Fresnel reflection and total internal reflection artifacts. Such displays advantageously have very low surface visibility and can be used in brightly lit environments without significant degradation of front-of-screen contrast. Such displays are able to demonstrate increased out-of-screen depth ranges.

BRIEF DESCRIPTION OF THE DRAWINGS

To allow better understanding, an embodiment of the present invention will now be described by way of non-limitative example with reference to the accompanying drawings, in which:

FIG. 3a is a side view of an apparatus for manufacturing a surface relief birefringent liquid crystal component;

FIG. 3c is a schematic view of alignment orientations on surfaces a surface relief birefringent liquid crystal component;

FIG. 3d is a side view of a further manufacturing apparatus;

FIG. 3h shows in planar view the cutting of a motherglass substrate;

DETAILED DESCRIPTION

Figure 1:
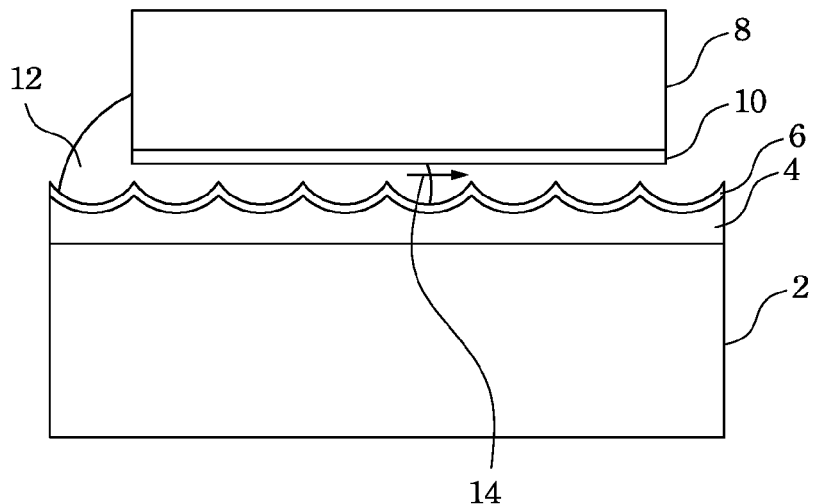
FIG. 1 is a side view of surface relief birefringent liquid crystal component during a prior art filling method.
Figure 2:
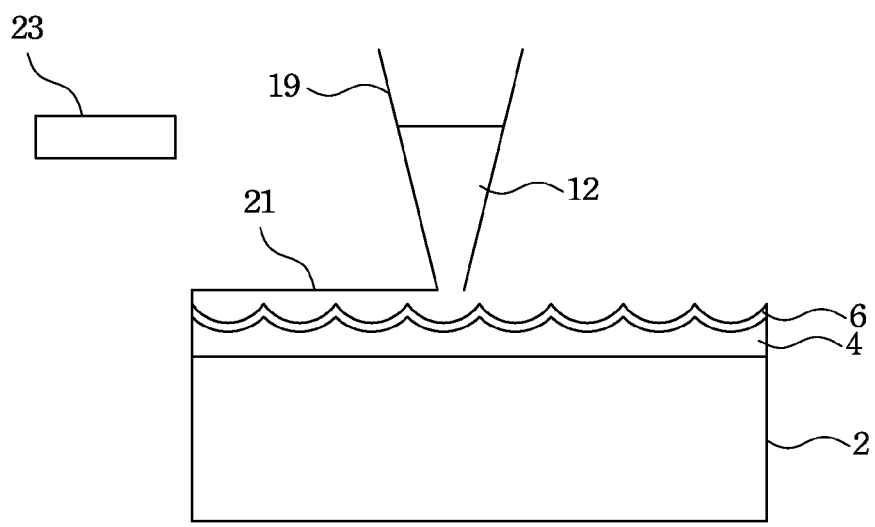
FIG. 2 is a side view of a notional coating apparatus.
Figure 3B:
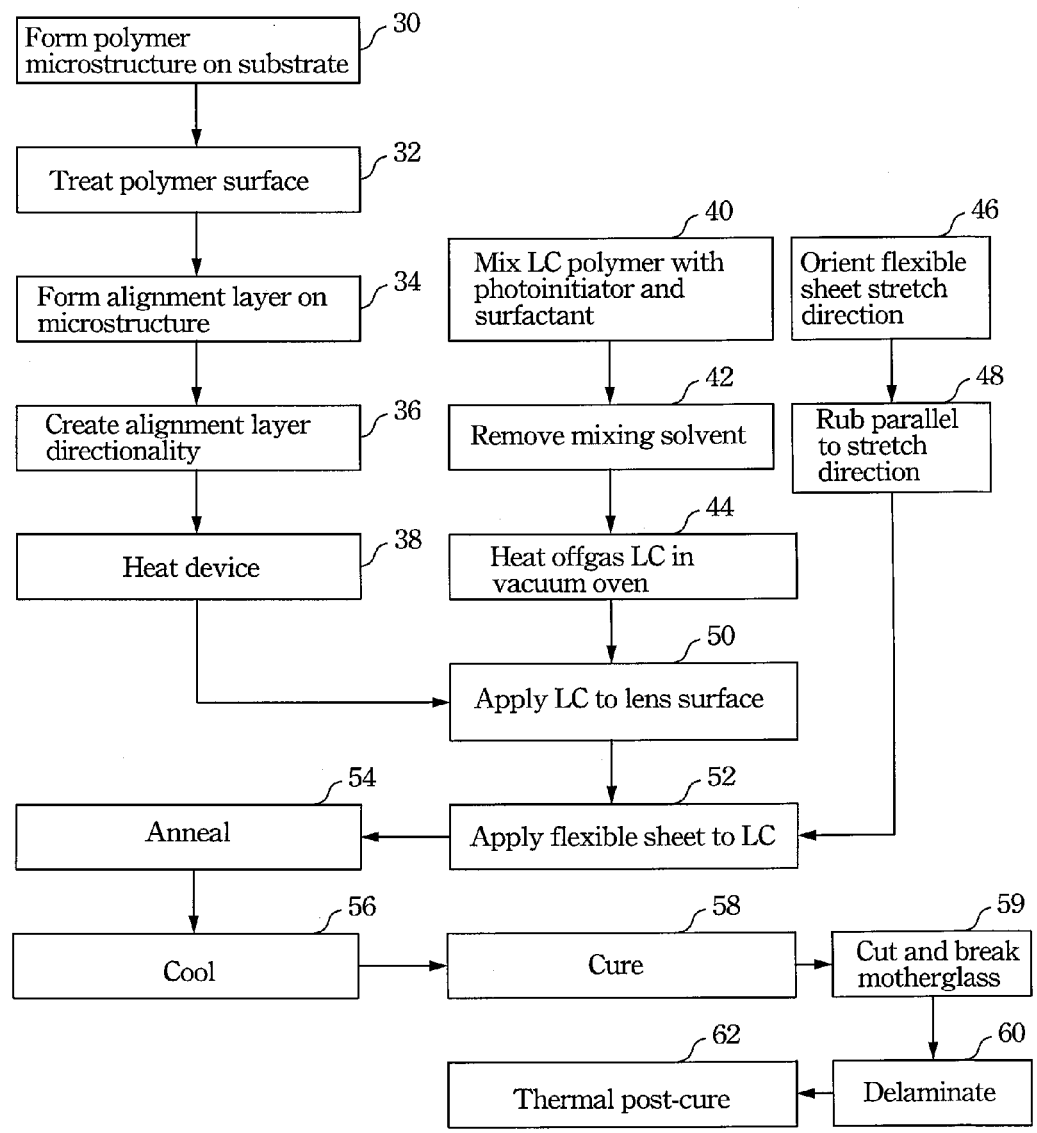
FIG. 3b is a flow chart of a method of manufacture of a surface relief birefringent liquid crystal component.

There will now be described with reference to FIG. 3b a method of manufacture of a surface relief birefringent liquid crystal component which may be performed using the apparatus shown in FIG. 3a. The steps shown in FIG. 3b can be carried out in any order, not limited to the order in which they are described below.

In step 30, a rigid substrate 2, which may be made of glass or a polymer, has a surface relief layer 4 formed on its surface. The surface relief layer 4 comprises a first material which in this example is isotropic and a polymer. The outer surface of the surface relief layer 4 (uppermost in FIG. 3a) is shaped with a surface relief structure, in this case comprising an array of cylindrical lens surfaces. The substrate 2 may alternatively be semi-rigid or flexible, for example when flatness or dimensional stability of the birefringent liquid crystal component is not critical. The substrate 2 may in some cases be of the same material as the isotropic polymer material 4.

In step 32, the surface relief structure of the surface relief layer 4 is treated, for example by washing, and/or by UV ozone treatment to remove surface contamination.

An alignment layer 6 is coated in step 34 onto the surface of the lens, and cured as well known in the art, followed by a rubbing process step 36. The alignment layer 6 provides the surface relief structure of the surface relief layer 4 with a liquid crystal alignment property. Alternatively, step 36 can comprise a photoalignment step.

The substrate is then heated in step 38 in the apparatus shown in FIG. 3a, for example by means of a heater pad 26, by means of blowing hot air across the surface of the device, or by placing the device in an oven at the desired temperature, say 90 degrees Celsius. The process temperature is typically above the crystalline to nematic transition temperature of the polymerisable liquid crystal material 12 which is described further below, but low enough to minimise thermal cure of the material. If a material which supercools is used, the processing temperature may advantageously be below the crystalline to nematic transition temperature. With suitable materials this can include room temperature.

In step 40, a UV curable liquid crystal material 12 is mixed with a photoinitiator to improve cure by UV radiation. The liquid crystal material 12 may be for example RM257 or RMM34c from Merck, or LC242, LC270 or LC1057 from BASF. The material may comprise mixtures of mesogenic and non-mesogenic compounds. An additional nematic liquid crystal material may be added to modify the refractive index and viscosity parameters, forming a liquid crystal gel material.

The liquid crystal material 12 may have a supercooling property so that it maintains an aligned nematic state when the device is cooled below the crystalline to nematic transition temperature for an extended time. Such materials have a crystalline phase, melting to a nematic phase at a transition temperature. On cooling the nematic phase material, a supercooled state is achieved in which nematic properties of the liquid crystal may be maintained. Supercooled materials advantageously have a higher viscosity than materials above the crystalline to nematic transition temperature, and are thus less sensitive to flow during cure. Such materials advantageously allow the stress due to flow to be minimised during cure.

Possible photoinitiators for radical polymerization are for example Irgacure 651, Irgacure 184, Darocure 1173 or Darocure 4205 from Ciba Geigy, or TPO-L from BASF when polymerizing by means of UV light. The photoinitiator concentration preferably comprises 0.01% to 10%, very preferably 0.1% to 3%.

Also, a surfactant material such as Fluorad 171 from 3M Co., Zonyl FSN from DuPont or BYK361 from BASF may be incorporated into the liquid crystal material 12 to improve surface wetting and adhesion of the liquid crystal material 12 to the alignment layer 6. The surfactant concentration preferably comprises 0.01% to 1%. Further components may include for example catalysts, stabilizers, chain-transfer agents, and co-reacting monomers.

Alternatively, the layer 4 may be formed from a material with a liquid crystal alignment property and the layer 6 omitted. The surface of the layer 4 may be rubbed, as well known in the LCD industry.

The materials may be mixed in step 40 in a solvent such as dichloromethane, methyl ethyl ketone or other well known low boiling point solvent. After mixing, the solvent is boiled off in step 42 in a fume hood at room temperature for about twelve hours, leaving a dried residue of mixed liquid crystal material 12. In step 44, the material is heated into the nematic phase and a vacuum applied to remove residual air bubbles from the mixture.

A flexible sheet 16 having an outer surface (lowermost in FIG. 3d) provided with a liquid crystal alignment property is prepared as follows. The flexible sheet 16 is sufficiently flexible to allow removal from the liquid crystal cell by peeling. As such it is more flexible than the rigid substrate 2. Alternatively, the flexible sheet 16 may have similar flexibility to the substrate 2. To optimise delamination performance, the adhesion of the material 12 to sheet 16 should be less than the adhesion at interfaces of material 12 to layer 6, layer 6 to material 4 and material 4 to substrate 2.

Preferably the flexible sheet 16 is a film made of a polymer, for example polyethyleneterephthalate (PET), polyvinylalcohol (PVA), polycarbonate (PC), triacetyl-cellulose (TAC), or any mixture thereof. Isotropic or birefringent substrates can be used. In case the substrate is not removed from the coated flexible sheet 16, preferably isotropic substrates are used. The thickness of the flexible sheet 16 may be in the range, but not limited to, 50 µm to 300 µm.

Alternatively, the flexible sheet 16 may have a well defined birefringence characteristic, and may be used as an additional waveplate in an optical structure, for example to increase the viewing angle of a separate polarisation switching element (not shown).

In step 46, the stretch direction may be determined by examining the angle of the flexible sheet 16 for maximum extinction between crossed polarisers and the flexible sheet 16 oriented with respect to the stretch direction.

The material of the flexible sheet 16 is chosen to provide a liquid crystal alignment property intrinsically. Prior to application to the cell, in step 48 the flexible sheet 16 may be rubbed, as well known in the LCD industry. The rubbing process may be aligned parallel to the stretch direction of the flexible sheet 16 if a birefringent film is used. The flexible sheet 16 may also be rubbed in other than the stretch direction.

In step 50, the heated liquid crystal material 12 is applied to the surface relief structure of the layer 4 by means of a dispenser 11 as shown in FIG. 3a. The dispenser 11 may for example comprise a heated funnel such that the liquid crystal material 12 is applied in liquid form. Alternatively, the dispenser 11 may apply crystalline liquid crystal material 12 which is heated above the nematic to crystalline transition temperature in the apparatus. Advantageously, a single coating of liquid crystal material 12 is required. As shown in FIG. 3a, in this embodiment the thickness of the liquid crystal material 12 is not constrained and so the liquid crystal material 12 bulges above the level taken in the final component.

In step 52, the flexible sheet 16 is applied onto the surface of the liquid crystal material 12 by draping the flexible sheet 16 over the layer 4 by means of an application bar 18 which moves in contact with the exterior surface of the flexible sheet 16 over the flexible sheet 16. In fact as apparent from FIG. 3a, step 50 of applying the liquid crystal material 12 and step 52 of applying the flexible sheet 16 are performed simultaneously, the liquid crystal material 12 being applied into the gap between the layer 4 and the flexible sheet 16 in front of the application bar 18 as the flexible sheet 16 is draped on. Thus the application bar 18 squeezes the liquid crystal material 12 to a controlled thickness governed by the height of the application bar 18. Thus the surface of the liquid crystal material 12 opposite from the surface relief structure is planar.

The application bar 18 may be a member having a variety of forms. The application bar 18 may have a circular cross section for example and may optionally have an outer coating 20, such as a rubber material. Alternatively the application bar 18 may have a non-circular cross section, such as a rubber wiper. The application bar 18 may roll or slide as shown by arrows 22 and 24 respectively across the surface of the flexible sheet 16, thus trapping a layer of material 12 between the flexible sheet 16 and the alignment layer 6. The direction of application is shown in FIG. 3a as orthogonal to the geometric axis of the lenses of a lenticular array microstructure. However, in the case of such elongate structures, it is generally preferable that the application direction is parallel to the geometric axis of the lenses so that the material can flow uniformly down the channels without trapping air bubbles.

The orientation of the flexible sheet 16 with respect to the layer 4 is selected to provide a desired degree of twist between the alignment directions of the flexible sheet 16 and the layer 4. This adjusts the twist angle of the liquid crystal director within the liquid crystal material 12 after curing as described below. The alignment directions may for example be as shown in FIG. 3c. The alignment direction on the surface relief structure of the layer 4 may be parallel to the geometric axis of the cylindrical lenses in a lenticular array and at an angle of 135☐ to the aligning angle on the flexible sheet 16. Alternative alignment directions may be used depending on the requirements of the optical architecture.

The technique for applying the liquid crystal material 12 in step 50 may be varied from that described above, in general to apply the liquid crystal material to either or both of the flexible sheet 16 and the layer 4.

By way of example, FIG. 3d shows a modification of step 50 in which the liquid crystal material 12 is coated onto the flexible sheet 16. The liquid crystal material 12 may be applied to the flexible sheet 16 by means of a known coating technique and may be in nematic, supercooled nematic or crystalline states. Applying the flexible sheet 16 near to the surface 6 may heat the material 12 into the nematic phase. Advantageously, the liquid crystal material 12 can be applied prior to application of the flexible sheet 16 in step 50, reducing complexity of the coating method. Advantageously, the required thickness of nematic liquid material can be set by determining the thickness of the layer on the flexible sheet 16 prior to application to the layer 4.

Figure 3E:
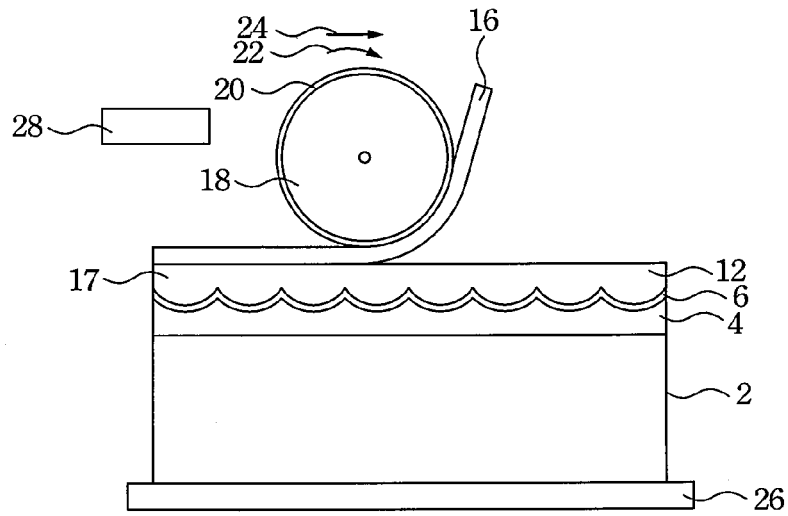
FIG. 3e is a side view of a further manufacturing apparatus.

As a further example FIG. 3e, shows a modification of step 50 in which the liquid crystal material 12 is coated onto the layer 4 in advance of step 50 of applying the flexible sheet 16. The liquid crystal material 12 may be coated by means of a known coating technique, for example by means of a bar coater, and may be in supercooled or crystalline state prior to introduction into the heated coating apparatus. Advantageously, the liquid crystal material 12 can be distributed over the layer 4 prior to application of the flexible sheet 16 in step 50, reducing complexity of the coating method. The material 12 in FIG. 3e does not need to be uniformly distributed, as the flexible sheet 16 will provide uniformity of thickness after coating.

Figure 3F:
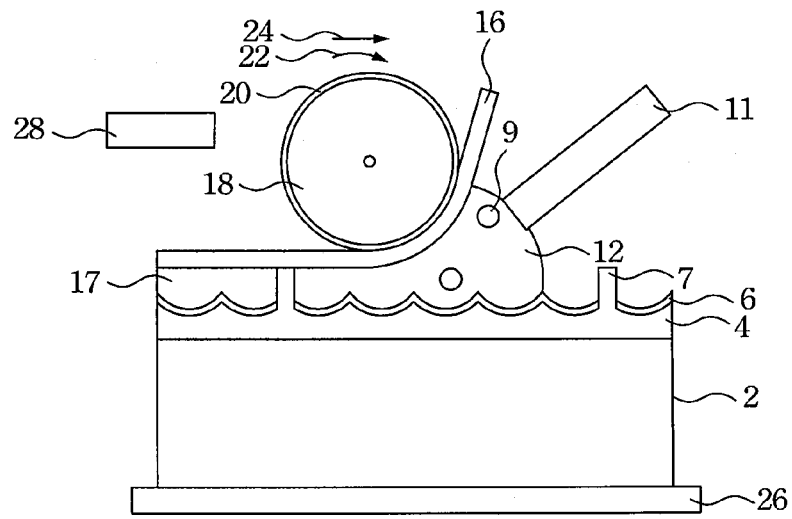
FIG. 3f shows the use of spacer layer to increase LC thickness during a coating process.
Figure 3G:
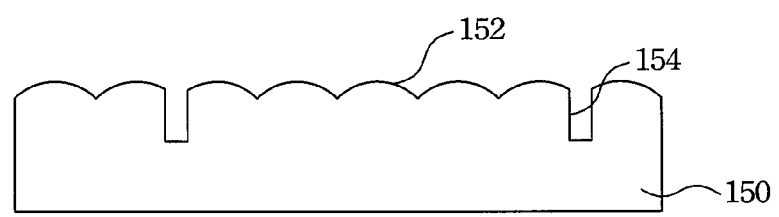
FIG. 3g shows the structure of a tool.

In a further embodiment of the invention, the isotropic material 4 may have a structure 7 formed on its surface as shown in FIG. 3f. During the coating process, the structure 7 serves to provide a spacing for the film 16 and liquid crystal layer 17. The thickness of the film 16 may be adjusted to provide adequate thickness uniformity over the area between the structures 7. Such a layer advantageously increases the liquid crystal layer thickness so that an adequate amount of guiding may take place in the region of the lens cusps so as to allow a uniform polarisation rotation across the whole area of the lens. FIG. 3g shows the structure of a tool 150 that may be used to form such a surface. The surface 152 has a lens structures corresponding to the desired lens surface. The surface may have additional holes 154 formed in it. When the replica is formed from the tool, the structures 7 are formed above the surface of the lens array. The holes 154 may be distributed in a pattern or randomly. The holes may comprise linear structures.

In an alternative embodiment, spacer balls 9 can be mixed into the LC material 12 as shown for example in FIG. 3f. The pillars 7 and balls 9 can be used together or as alternatives. The spacer may alternatively be formed in the sheet 16.

Alternatively, the liquid crystal material 12 may be applied in step 50 to both the flexible sheet 16 and layer 4 prior to coating.

Advantageously, it may not be necessary to use the liquid crystal material 12 under vacuum conditions reducing capital equipment cost and reducing the effect of contamination of the alignment for example by materials extracted from the surface relief layer 4.

After step 52, the device may be left to anneal residual disclinations in step 54. The device can then be cooled in step 56 to a lower temperature to increase the birefringence of the liquid crystal material 12 and to increase its viscosity during cure or to tune the refractive index of the ordinary component to that of the substrate.

In step 58, the liquid crystal material 12 is cured into a solid film 17 by means of actinic radiation such as electromagnetic (e.g. ultraviolet) radiation from a light source 28. The ultraviolet lamp may be filtered to remove wavelength components that may adversely affect the liquid crystal material 12 through absorption. Advantageously, the flexible sheet 16 enables the liquid crystal material 12 to be of the type, whose cure is inhibited by the presence of oxygen without the need for an inert gas blanket, thus reducing cost and complexity of the apparatus.

Following cure, a motherglass processing step 59 may take place as shown in FIG. 3h in which the substrate 2 is cut and broken along lines 68 to cut out individual birefringent liquid crystal components. If the substrate 2 is glass, the cut may be by means of a scribe. The step 59 may alternatively take place after steps 60 and 62. The phrase motherglass processing is used generically to mean cutting of substrate 2.

Subsequently, in a delamination step 60, the flexible sheet 16 is removed from the plane surface of the layer 17 of liquid crystal material 12. It is a particular advantage of that this removal is very easy as a result of the flexibility of the flexible sheet 16 providing a relatively low surface energy. For example the flexible sheet 16 may simply be peeled off.

The flexible sheet 16 may be used as a protection film prior to device assembly to remove the need for a cleaning step after processing. Therefore, a further protective film is not required after processing. To allow the flexible sheet 16 to serve as a protective layer, the delamination step 60 may be carried out at a later time after shipping and subsequent handling. Such a step advantageously avoids the need to clean the surfaces after fabrication and prior to device assembly, reducing cost and potential damage of the surface.

Optionally the substrate 2 could be removed by a delamination process performed after step 58 (and before or after steps 60 and 62).

In alternative embodiments, the pressure and speed of the application bar 18 can be adjusted so that a gap is formed between the top of the microstructure layer and the bottom of the flexible sheet 16, so as to allow for an increased thickness layer 17 of liquid crystal.

It may be possible to re-use the flexible sheet 16 after delamination, although typically this material would be reprocessed or disposed of.

The flexible sheet 16 may further comprise a diffractive alignment structure so as to improve the alignment of the liquid crystal material 12 at its surface. Optionally the flexible sheet 16 may be replaced by a metal film incorporating a diffractive alignment layer. In this case the liquid crystal material 12 can be cured from below through the lenses.

The pre-tilt of the alignment layer 6 may be reduced to minimise the deflection of the liquid crystal material 12 towards the centre of the lens on the tilted microstructured surface. Reducing pretilt can thus be used to improve contrast of the lens device.

The component may be held on a heated vacuum chuck or other mechanism so that the top surface is held flat, to avoid stress artifacts during cooling.

The birefringent liquid crystal components manufactured by this method may be used for a variety of purposes. Some non-limitative examples will now be given.

The component may be used as a birefringent microlens array for use in a switchable autostereoscopic display apparatus, as described in WO-03/015424 and WO-2005/006056 for example.

Figure 4:
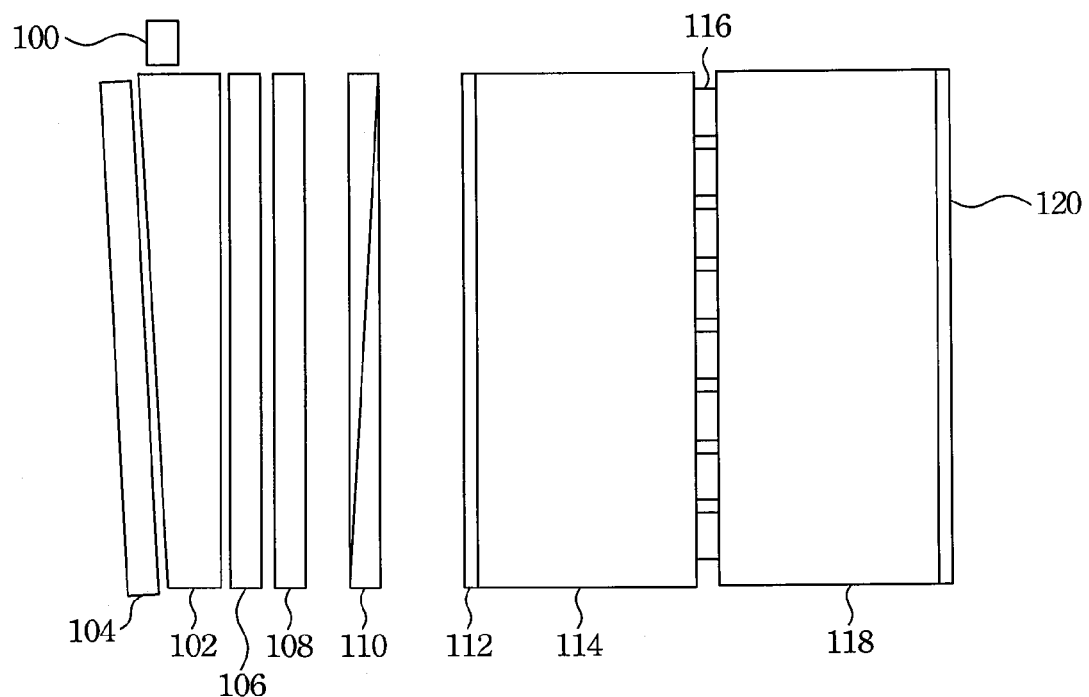
FIG. 4 is a side view of a backlight and display using a birefringent diffuser.
Figure 5:
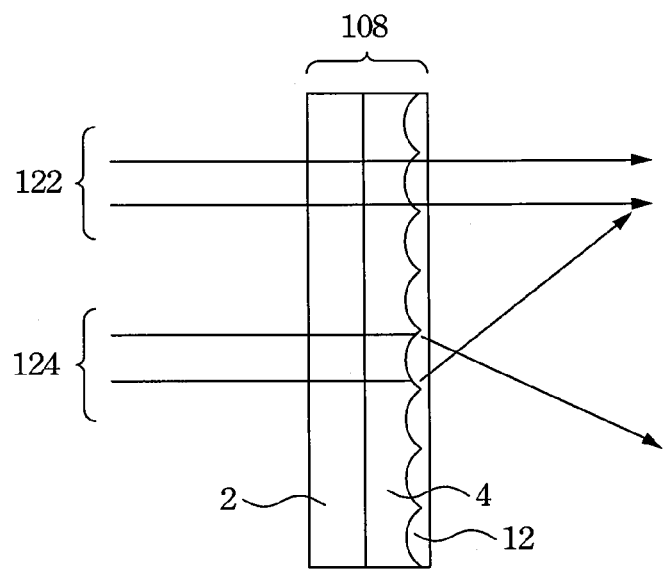
FIG. 5 is a side view of a birefringent diffuser.

The component may be used as a birefringent scattering element for use in a liquid crystal backlight apparatus for example as shown in FIG. 4. Such an apparatus may be used to recycle polarised light within the backlight of a display, thus increasing device efficiency. A transmissive or transflective display comprises a light source 100, a waveguide 102 and reflective film 104. Typically additional films are inserted including prismatic films 106 such as BEF from 3M, diffusers 108 and reflective polariser films 110 such as DBEF from 3M. The diffuser 108 can comprise a birefringent diffuser element such as shown in FIG. 5. Such a film may comprise a substrate 2, isotropic material 4 and birefringent material 12. Light rays 122 of a first polarisation may see an index match at the microstructured interface between the birefringent and isotropic materials whereas light rays 124 may see an index step so rays 122 are undeflected while rays 124 are deflected by the backlight. Advantageously, the light rays that are diffusing are passed through the polariser 110 and polariser 112 of the display which further comprises a substrate 114, pixel layer 116, substrate 118 and output polariser 120. Light rays which are not diffused are reflected by the polariser 110 into the backlight. The light is recirculated and depolarised in the backlight, to be returned to the output of the display. The birefringent diffuser advantageously allows light that will be recirculated not to be diffused. Such an arrangement increases the efficiency of the reflection of the light rays 122 from the polariser 110, and thus reduces the absorption of light in the polariser 112, increasing overall display efficiency.

The component may be used as a birefringent prismatic film for use in a polarised backlight.

Figure 6:
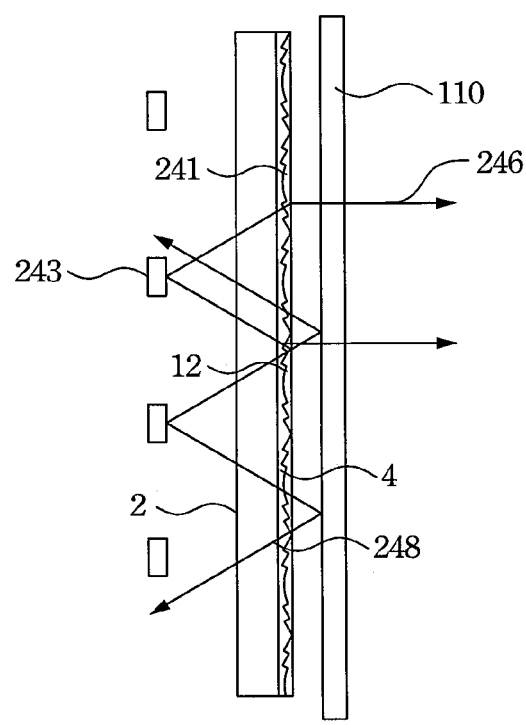
FIG. 6 is a side view of an alternative backlight arrangement using a surface relief birefringent liquid crystal component.

The component may be used as a polarisation sensitive collimating element for a backlight is shown in FIG. 6. A light source 243, for example an LED is positioned behind the aperture of a Fresnel lens aperture 241. The lens comprises a substrate 2, an isotropic layer 4 and a birefringent layer 12. Light of a first polarisation is substantially collimated by the lens 4, 241, 12 whereas light of an orthogonal polarisation is uncollimated. The collimated light is passed through a polarisation sensitive reflector 110 along rays 246. This light is transmitted through the input polariser of the LCD panel. The uncollimated light is passed back into the backlight for recirculation. Such an arrangement provides improved diffusion of the recirculating light, whereas the collimated light from the backlight is passed through the panel, advantageously increasing display brightness characteristics. Such an arrangement further reduces the visibility of the LED light sources. Alternatively, the collimated light may be reflected by the polariser 110 and the uncollimated light may be transmitted at which point it is diffused. As the incident light is on-axis, such an arrangement may increase the efficiency of reflection of light by the polariser 110.

Figure 7:
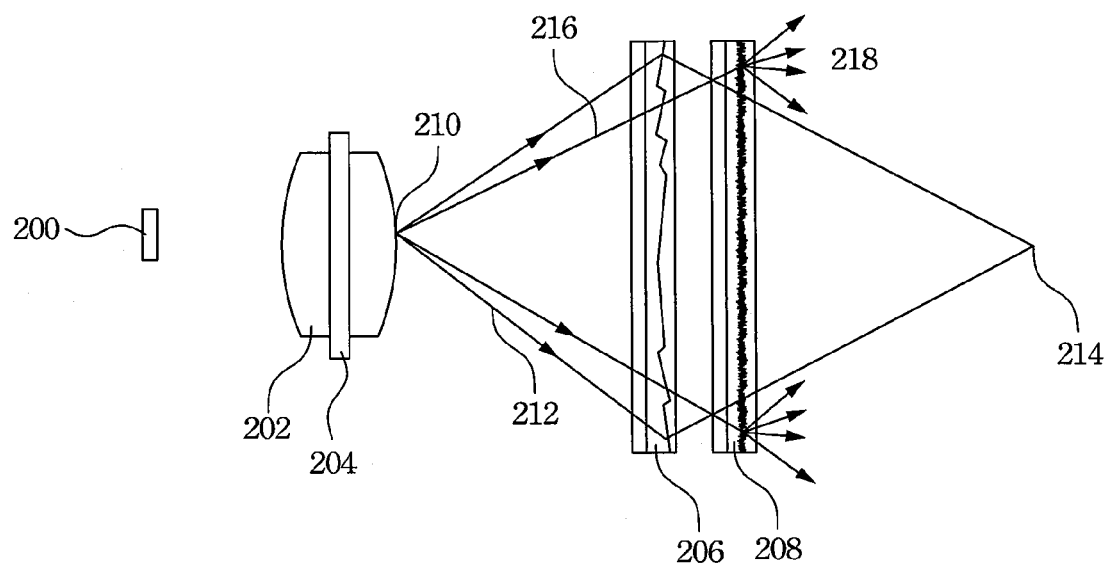
FIG. 7 is a side view of a projection apparatus incorporating surface relief birefringent liquid crystal components.

The component may be used as a polarisation sensitive projection screen, for example as shown in FIG. 7. An illuminated display device 200 is imaged by a projection lens 202. A polarisation switch 204 controls the output polarisation from the projection lens. Light of a first polarisation falls onto a projection screen 206 comprising a birefringent optical element of the present invention. The screen 206 may be for example a Fresnel lens. The screen may direct light rays 212 from an object 210 near the pupil of the projection lens to a region 214 in front of the display. The screen 208 may comprise a birefringent diffusing microstructure, which has no effect on the rays 212. In the orthogonal polarisation state, the screen 206 has no optical effect on the rays 216 which after striking the screen 208 are diffused into a ray bundle 218. Thus, a polarisation switch 204 can be used to control the directionality of a projection display. The diffuse mode can be used to provide a wide viewing angle, whereas the directional mode can be used to provide a high gain screen with high brightness from a limited range of angles. Such a screen may be appropriate for laser projectors for example. The image 214 may be tracked in correspondence with the movement of an observer. Multiple images 214 may be produced from multiple projection apertures 210, such that an autostereoscopic viewing function is enabled for example. In this case, the lens 206 is enabled while the diffuser 208 is disabled.

Figure 8:
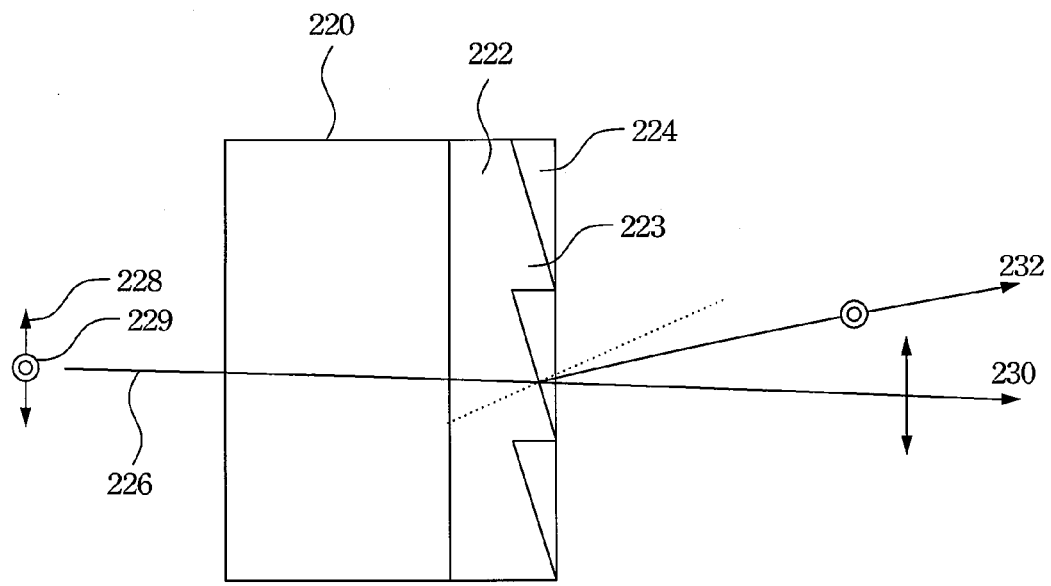
FIG. 8 is a side view of a beamsplitting optical element.

The component may be used as a polarising beamsplitters as shown in FIG. 8. A prismatic microstructure surface 223 is formed on a substrate 220 in a first polymer material 222 with a first isotropic refractive index. A birefringent material 224 is formed on the microstructure. An incident light ray 226 of polarisation state 228 sees a first index step at the interface surface 223, and is deflected accordingly along light ray 230. Light of the orthogonal polarisation state 229 sees a different index step at the surface 223 and undergoes a different deflection along light ray 232. Such an element conveniently is low cost to manufacture and has a flat structure compared to cube type polarisation beamsplitters. Such an element may be used in position encoders, projectors, fibre-optic communications, backlight apparatus or other polarisation dependent switching apparatus.

Figure 9:
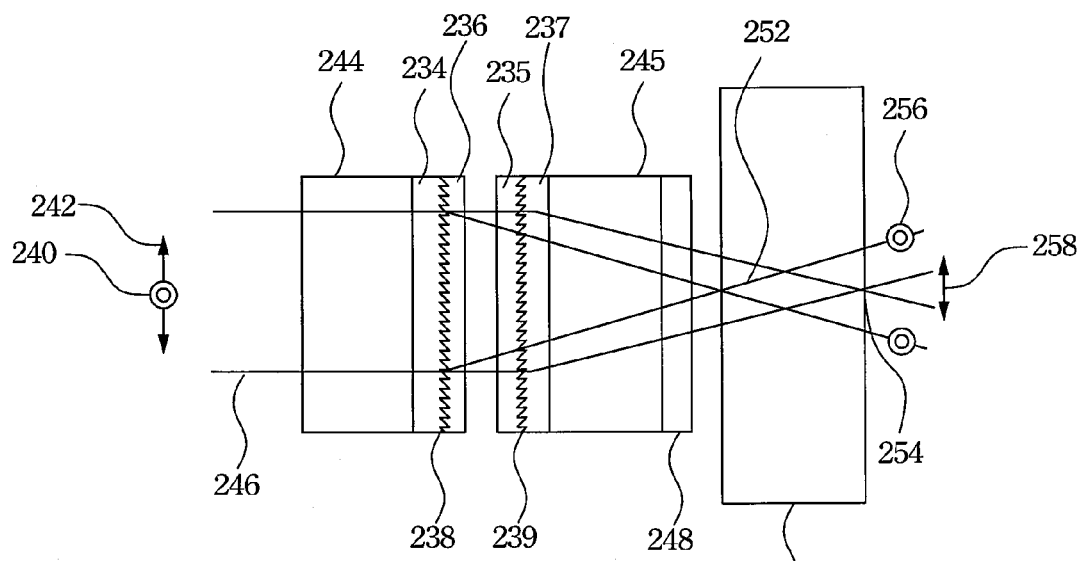
FIG. 9 is a side view of a dual layer focussing device.

The component may be used as a polarisation dependent diffractive element is shown in FIG. 9. A dual function device is formed from a first surface relief diffractive structure formed by a substrate 244, an isotropic polymer 234, and a liquid crystal polymer 236 with a surface relief diffractive interface 238. A second diffractive element is formed by a second substrate 245, an isotropic polymer 237, and a liquid crystal polymer 235 with a surface relief diffractive interface 239. A quarter waveplate 248 is fitted to the output of the device. The device can be used for example to image light spots onto two separate surfaces, such as layers of a dual layer optical medium. Light of a first polarisation state 240 falls onto the device. The first element has an index step at the interface 238 for light of this polarisation state, but no index step for light of the second polarisation state 242. The diffractive interface 238 is arranged to direct light onto a first spot 252 on the first surface of the substrate 250. The waveplate 248 converts the polarisation state to circular polarisation. The second diffractive element images the polarisation 242 to a second spot to a second spot 254 at a different surface of the substrate 250. Alternatively, the diffractive elements 238,239 could be replaced by lens structures such as Fresnel lenses with the same effect. The invention advantageously produces separate focal points for different polarisation states. Such an embodiment overcomes the need for beamsplitters elements to combine the outputs of two focusing systems, and thus is cheaper and simpler to manufacture. Such an element can be used for example in a DVD read/write mechanism and optical position encoders.

In all of the above embodiments, further layers such as pressure sensitive adhesives and hard coats may be applied to the outer layer of the elements subsequent to fabrication of the birefringent layer. Such layers may be applied through a coating process.

Figure 10A:
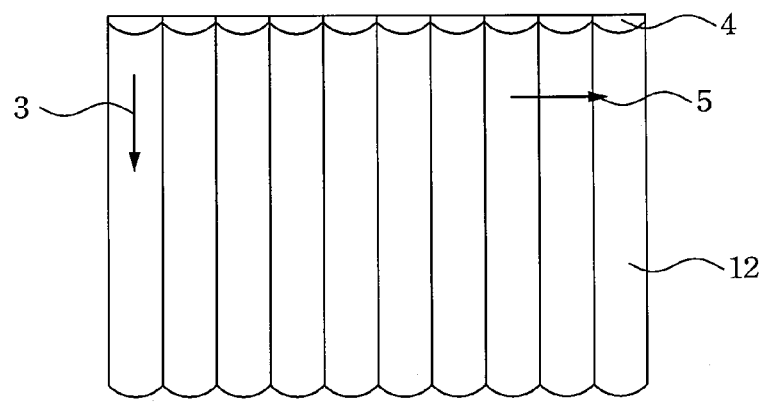
FIGS. 10a and 10b show in planar view and side view, respectively, the alignment directions in a lens of the invention.

In a further embodiment, the layer 4 may be formed from a material comprising dipoles that can be aligned to provide a liquid crystal aligning function. As shown in FIG. 10a, the material of the layer 4 may have a surface relief structure formed on its upper surface, and the surface rubbed to form an alignment direction, aligned with the lenticular axis. Advantageously, the requirement to form an additional alignment layer 6 on the layer 4 may be removed, thus reducing cost and temperature of processing that would be required for alignment layer baking. The material of the layer 4 may be birefringent with an amorphous or partially aligned dipole structure. Alternatively, the material of the layer 4 may have uniformly aligned dipoles in which one of the refractive indices of the material of the layer 4 is matched to at least one of the indicia of the birefringent material 12 with a fast axis alignment such that for one polarisation state, the two materials have substantially the same refractive index. For the orthogonal polarisation state, the materials have different refractive index determined by the birefringence of each of the materials.

Figure 10B:
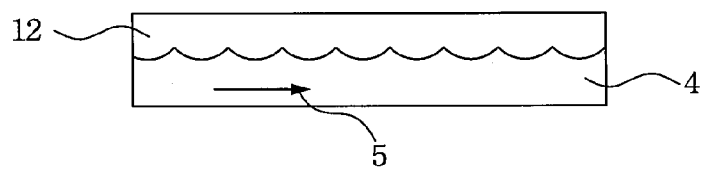

In one illustrative example, the material of the layer 4 may be a thermoplastic material, which is formed using a stretching process such that a higher refractive index is seen for polarised light parallel to the stretch direction 5. Alternatively, the higher refractive index may be orthogonal to the stretch direction 5. A surface relief structure is then formed on to one of its surfaces, for example by embossing. This has a lenticular structure with geometric axis direction 3 oriented orthogonally to the stretch direction 5 of the film. The material is rubbed parallel to the lenticular axis direction 3 to realign the dipoles at the surface of the layer. A liquid crystal layer is applied to the surface of the material of the layer 4 using the method of the present invention, without the requirement for further alignment layers, forming the structure as shown in FIG. 10b. The refractive index of the material of the layer 4 in a direction parallel to the stretch direction 5 of the film (orthogonal to the lens axis direction 3) is index matched with the liquid crystal 12, while the refractive index orthogonal to the stretch direction 5 (parallel to the lens axis direction 3) forms a refractive index step with the liquid crystal 12. Light of a polarisation parallel to the stretch direction sees substantially no optical function, while light polarised orthogonally sees an index step. In this way, advantageously the optical power of the lens can be increased.

The material of the layer 4 may be a birefringent thermoplastic, such as PET or polycarbonate, a liquid crystal or other birefringent material. Typically, the birefringence of the material of the layer 4 will be significantly lower than the birefringence of the liquid crystal 12. The directions 3 and 5 may alternatively be parallel.

Such lenses may conveniently be formed in a web process. In all of the embodiments of the present invention, the substrate 2 may be birefringent. In the case in which the substrate is between a polariser and the lens structure 4, 12 then at least one of the indicia of the substrate 2 may be aligned parallel or orthogonal to the direction of the alignment of the liquid crystal 12 at the surface of the material 4. In the case where the substrate 2 is between the lens 4, 12 and the output of the display and in which there is no output polariser, then the substrate may have an arbitrary alignment. The structures of the present invention may be conveniently formed using a web or roll-to-roll process. This may be used to reduced device cost and increase the size of fabricated devices.

In a further application of the elements of the invention, it may be desirable to increase the optical power of the elements that can be made with available materials. For example, it may be desirable to reduce the focal length of lenses of the invention. Available isotropic materials typically have refractive indices in the region 1.45-1.6. Available liquid crystal materials typically have birefringence in the region 0.06-0.3. Curable liquid crystal materials typically have birefringence in the region 0.12-0.2. The optical power of a surface can be increased by reducing the radius of curvature of the surface. However, if the radius of curvature becomes too small, the surface has high tilt and high sag, such that the liquid crystal layer thickness increases, aberration effects increase and the total internal reflection effects may become noticeable. Further lenses of equivalent optical power made from two curved surfaces with a lower index step typically have less Fresnel reflections than one surface with a high birefringence.

Figure 11A:
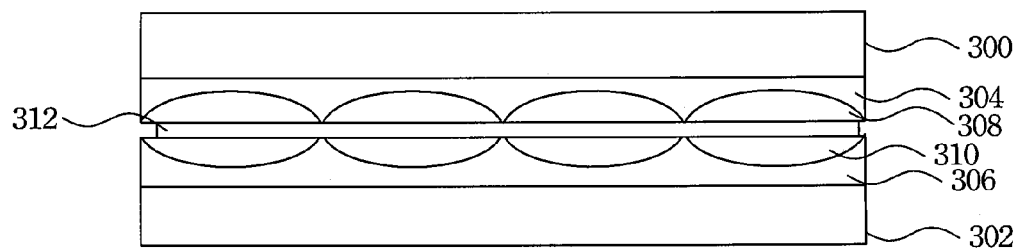
FIG. 11a shows a double lens.
Figure 11B:
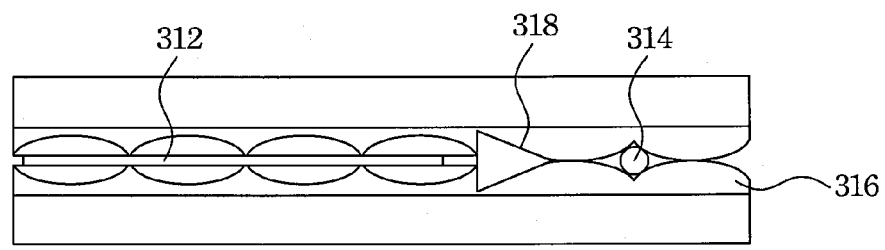
FIG. 11b shows an alignment mechanism for a double lens.

Desirably, the optical performance of the lens can be enhanced by the combination of two refractive surfaces such as shown in FIG. 11a. First and second lens arrays made in the manner of the current invention comprises substrates 300, 302, isotropic materials 304, 306, birefringent materials 308, 310 and an adhesive or optical coupling material 312. Alignment between the two surfaces may be achieved by means of active optical alignment using microscopes and translation stages prior to attachment for example. FIG. 11b shows a further passive alignment mechanism. During coating, a region of the isotropic surface may be uncoated to expose registration surfaces 316, 318. An alignment device 314 is inserted to provide lateral alignment between the two surfaces. Such an alignment device may for example be a ball or fibre.

Figure 12:
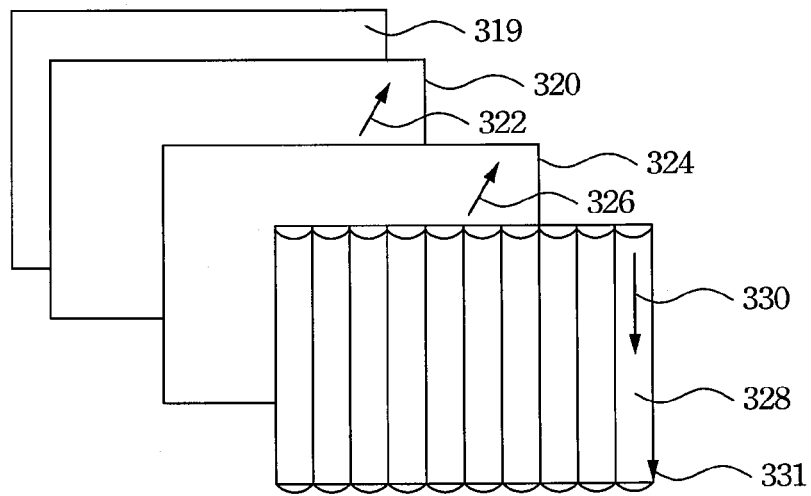
FIG. 12 shows a 3D only display using the lenses of the present invention.

In another application of the elements of the present invention, a directional display may be configured by attachment of a birefringent lens array of the present invention to the front of a polarised output display such as a Liquid Crystal Display with pixel plane 319 as shown in FIG. 12. For example, the output polariser 320 of the display may have an electric vector transmission direction 322. The alignment direction 326 on the plane surface 324 of the lens array may be parallel to the direction 322, while the alignment direction 330 on the lens array surface 328 may be parallel to the lens optical axis direction 331.

Such an element provides a high quality lens array with low surface visibility using known solid materials which are low cost and straightforward to handle without requiring for example sealing of liquid materials. Advantageously, the lenses are aligned with the polarisation direction of the panel, such that incident light of one polarisation state (which is index matched between the isotropic and birefringent materials) is not reflected at the lens interface, which halves the visibility of the lens array surface. In the orthogonal polarisation state, the Fresnel reflectivity and total internal reflection artifacts are substantially reduced compared to a lens surface in air. The front surface of the optical element can further be anti-reflection and hard-coat coated so as to reduce specular reflections from the display in air and to increase display durability. The lenses may have a tilted optical axis direction 331 compared to the direction of the pixel columns of the display 318.

Compared to prior art displays, such a display has low levels of lens visibility in brightly lit ambient environments, thus producing higher quality 3D images. The visibility of the display surface is reduced, so that the 3D images may extend forward from the display surface (crossed disparity condition) without visual conflict from the display surface. Such lenses advantageously provide bright 3D images with large amounts of image depth.

Figure 13A:
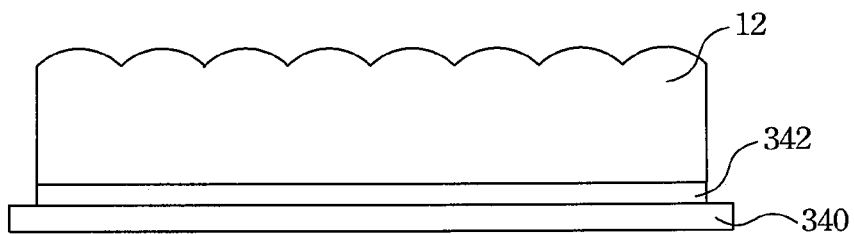
FIGS. 13a and 13b are side views of a further embodiment.
Figure 13B:
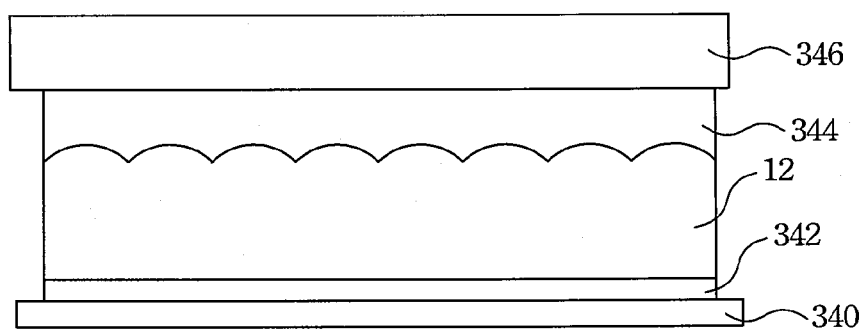

In a further embodiment of the invention, the cured liquid crystal material 12 may further be bonded to a carrier substrate 340 by means of an adhesive layer 342 and the cured polymer material 12 may then be detached from the layers 4 and 6 so that surface relief birefringent lenses in air are formed as shown in FIG. 13a. The cured polymer may then be detached from the material of the layer 4, so that surface relief birefringent lenses in air are formed. Such lenses may be used together with a display device 346 using a further intermediate material 344 with refractive index matched to one of the indicia of the birefringent material, as shown in FIG. 13b. Conveniently, the carrier substrate 2 and material 4 used during coating may be different from the substrate 340 and index matching material 344 used during operation of the device. For example the material 4 maybe tuned to provide an alignment function and a release function without requiring tuning of refractive index, while the material 344 may be tuned in refractive index and for adhesion. Thus the performance of the device can be optimised.

What is claimed is:

1. A method of manufacture of a birefringent liquid crystal component, the method comprising:
    forming (a) a layer of first material having an outer surface which is shaped with a surface relief structure and is provided with a liquid crystal alignment property, and (b) a flexible sheet having an outer surface provided with a liquid crystal alignment property;
    applying a curable birefringent liquid crystal material to one or both of the outer surface of the layer of first material and the outer surface of the flexible sheet;
    applying the flexible sheet over the layer of first material with the outer surfaces of the layer of first material and the flexible sheet facing one another with the curable birefringent liquid crystal material therebetween, thereby to form a liquid crystal cell;
    curing the curable birefringent liquid crystal material; and
    removing the flexible sheet from the liquid crystal cell, thereby to form a birefringent liquid crystal component.

2. A method according to claim 1, wherein the flexible sheet is applied over the layer of first material with a twist between the alignment directions of the liquid crystal alignment properties of the flexible sheet and the layer of first material.

3. A method according to claim 1, wherein the step of applying the flexible sheet over the layer of first material is performed by draping the flexible sheet over the layer of first material.

4. A method according to claim 3, wherein the step of applying the flexible sheet over the layer of first material is performed simultaneously with performing the step of applying a curable birefringent liquid crystal material by dispensing the liquid crystal into the gap between the flexible sheet and the layer of first material.

5. A method according to claim 1, wherein the curable birefringent liquid crystal material is applied to either or both of the outer surface of the layer of first material and the outer surface of the flexible sheet by a coating process in advance of said step of applying the flexible sheet over the layer of first material.

6. A method according to claim 1, wherein said step of applying the flexible sheet over the layer of first material further comprises moving a member over, and in contact with, the exterior surface of the flexible material.

7. A method according to claim 1, wherein the layer of first material is formed on a substrate and remains on the substrate during said steps of applying a curable birefringent liquid crystal material, applying the flexible sheet over the layer of first material, curing the curable birefringent liquid crystal material, and removing the flexible sheet from the liquid crystal cell.

8. A method according to claim 7, further comprising removing the substrate from the liquid crystal cell after removing the flexible sheet.

9. A method according to claim 1, wherein the material of the flexible sheet is a polymer.

10. A method according to claim 1, wherein the material of the flexible sheet comprises polyethyleneterephthalate, polyvinylalcohol, polycarbonate, triacetyl-cellulose or any mixture thereof.

11. A method according to claim 1, wherein the outer surface of the flexible sheet is provided with said liquid crystal alignment property by an intrinsic property of the material of the flexible sheet.

12. A method according to claim 1, wherein the outer surface of the flexible sheet is rubbed to form a substantially uniform liquid crystal alignment property.

13. A method according to claim 1, wherein the first material is isotropic.

14. A method according to claim 13, wherein the first material is a polymer.

15. A method according to claim 1, wherein the first material is birefringent and has at least one index which is substantially the same as at least one of the indicia of the curable birefringent liquid crystal material.

16. A method according to claim 1, wherein the outer surface of the layer of first material has an alignment layer providing said liquid crystal alignment property.

17. A method according to claim 1, wherein the curable birefringent liquid crystal material has a supercooling property.

18. A method according to claim 1, wherein the curable birefringent liquid crystal material is curable by electromagnetic radiation, the flexible sheet is transparent to said electromagnetic radiation, and the step of curing the curable birefringent liquid crystal material is performed by applying said electromagnetic radiation through said flexible sheet.

19. A method according to claim 1, wherein the flexible sheet is removed by peeling.

20. A method according to claim 1, applied to manufacture plural birefringent liquid crystal components together in motherglass form and further comprising cutting out the individual birefringent liquid crystal components.

21. A method of manufacturing a non-switching autostereoscopic display apparatus, the method comprising:
    manufacturing a birefringent liquid crystal component by a method according to claim 1;
    assembling a display apparatus comprising a pixel plane, a polariser disposed between a pixel plane and the output of the display apparatus, and the birefringent liquid crystal component arranged to provide substantially a lens function for polarised light parallel to the output polarisation of the display apparatus and substantially no lens function for light of an orthogonal polarisation state.

* * * * *